United States Patent
Maeshima et al.

(10) Patent No.: US 7,974,165 B2
(45) Date of Patent: Jul. 5, 2011

(54) ERROR DETECTION APPARATUS AND METHOD FOR A DISC LOADING SYSTEM

(75) Inventors: Hidetoshi Maeshima, Shiojiri (JP); Toshihiko Yanagisawa, Higashichikuma-gun (JP); Junichi Otsuka, Chikuma (JP); Takashi Kawamori, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 41 days.

(21) Appl. No.: 12/437,503

(22) Filed: May 7, 2009

(65) Prior Publication Data
US 2009/0279394 A1 Nov. 12, 2009

(30) Foreign Application Priority Data
May 7, 2008 (JP) ................................. 2008-121503

(51) Int. Cl.
*G11B 7/00* (2006.01)
(52) U.S. Cl. .................. 369/53.2; 369/53.41; 369/30.32; 720/601
(58) Field of Classification Search .................. 369/53.2, 369/53.41, 53.1, 53.11, 53.12, 53.21; 720/601, 720/602, 615, 630, 627, 628, 629
See application file for complete search history.

(56) References Cited

U.S. PATENT DOCUMENTS

| | | | |
|---|---|---|---|
| 5,181,081 A * | 1/1993 | Suhan | 356/394 |
| 5,640,535 A * | 6/1997 | Suzuki et al. | 369/84 |
| 5,734,629 A * | 3/1998 | Lee et al. | 369/30.34 |
| 5,914,918 A * | 6/1999 | Lee et al. | 369/30.32 |
| 5,956,311 A * | 9/1999 | Kawai | 369/100 |
| 6,222,800 B1 * | 4/2001 | Miller et al. | 369/30.19 |
| 6,400,659 B1 | 6/2002 | Kitaoka | |
| 7,028,216 B2 * | 4/2006 | Aizawa et al. | 714/7 |
| 2003/0222928 A1 * | 12/2003 | Cummins et al. | 347/2 |
| 2005/0157605 A1 | 7/2005 | Lilland et al. | |
| 2008/0170480 A1 * | 7/2008 | Ikemoto et al. | 369/47.1 |
| 2008/0273433 A1 * | 11/2008 | Nishioka et al. | 369/53.15 |

FOREIGN PATENT DOCUMENTS

| | | |
|---|---|---|
| JP | 2000-260172 A | 9/2000 |
| JP | 2005-259315 A | 9/2005 |
| JP | 2008-004168 A | 1/2008 |

* cited by examiner

*Primary Examiner* — Tan X Dinh
(74) *Attorney, Agent, or Firm* — Kilpatrick Townsend & Stockton LLP

(57) ABSTRACT

The effect of detection errors when detecting if a disc recording medium is in a disc drive is eliminated. A control unit 17 detects if an optical disc 11 was supplied to an optical disc drive 13 based on the operation of the transportation unit 16, causes the optical disc drive 13 to detect if an optical disc 11 is inside the disc drive, and compares the results of these detection operations. If the results do not match, the control unit 17 causes the optical disc drive 13 to repeat the operation discharging and loading the optical disc 11, and causes the optical disc drive 13 to again detect if an optical disc 11 is present after the discharge and loading operation. The control unit 17 then determines if the new detection result from the optical disc drive 13 and the detection result related to supplying the optical disc 11 to the optical disc drive 13 match, and based on the result of this evaluation detects an optical disc drive 13 operating error.

8 Claims, 5 Drawing Sheets

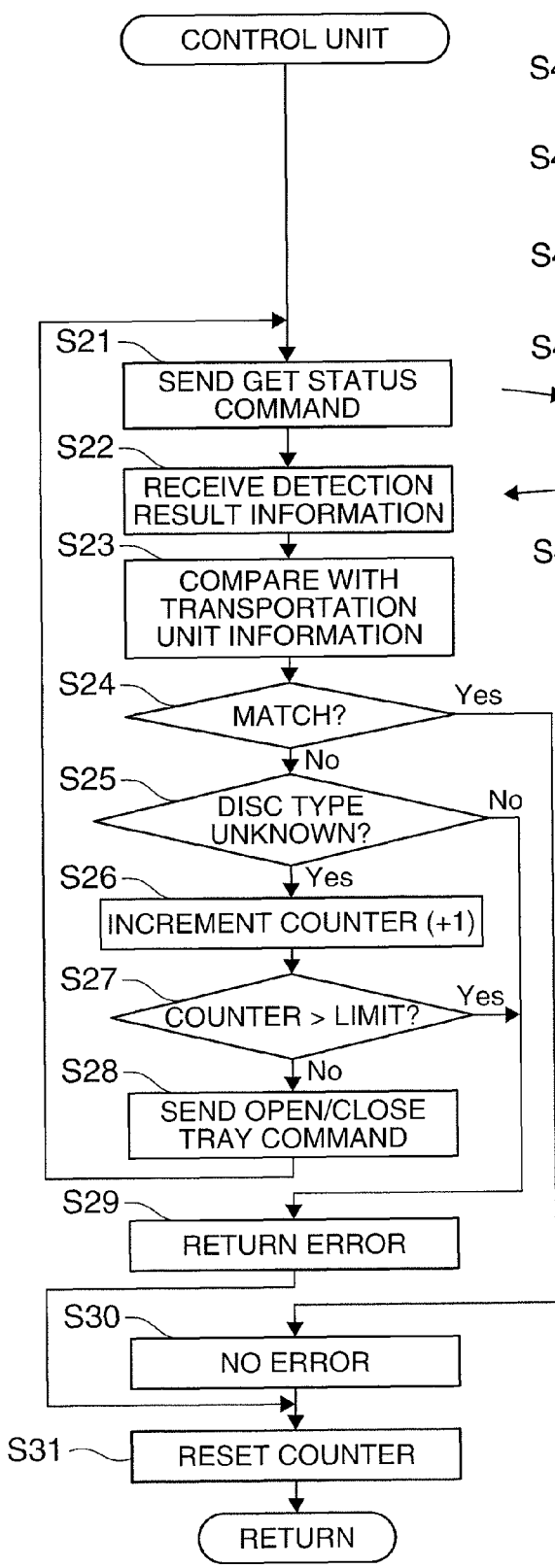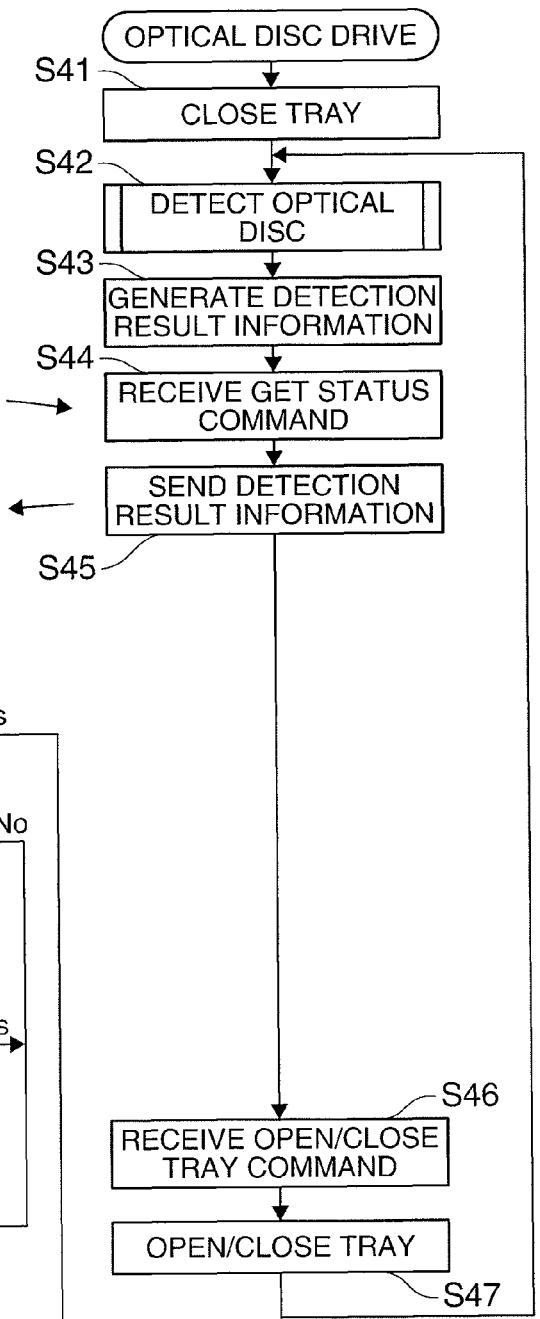

ERROR DETECTION APPARATUS AND METHOD FOR A DISC LOADING SYSTEM

This application claims priority to Japanese Patent Application No. 2008-121503, filed May 7, 2008, the entire disclosure of which is incorporated by reference herein.

BACKGROUND OF THE INVENTION

1. Field of Invention The present invention relates to a disc processing device for processing data recording media, and to a control method for the disc processing device.

2. Description of Related Art

Disc production systems that record data to disc-type data recording media such as CD-R and DVD-R media and then print an image on the label side of the media are known from the literature. See, for example, Japanese Unexamined Patent Appl. Pub. JP-A-2000-260172 and Japanese Unexamined Patent Appl. Pub. JP-A-2005-259318.

Such disc publishers and disc duplicators record data to the disc recording media using a disc drive, also commonly called a recorder or recording unit, and a transportation mechanism for conveying the disc media from a disc stacker in which a plurality of disc recording media are stored in a stack to the disc drive.

A problem with such disc duplicating systems is that disc recording media stacked together in the disc stacker may sometimes stick together, resulting in the transportation mechanism conveying a plurality of disc recording media to the disc drive with the discs stuck together. This problem is called "double-disc feeding" or "multifeeding," and can result in a variety of operating errors when the plural disc recording media separate from each other while being conveyed inside the disc duplicator or inside the disc drive. The disc drive therefore has a function for detecting if a disc recording medium is inside the disc drive. If the disc drive of this disc production system detects a disc recording medium when a disc recording medium should not be present, it determines that multifeeding has occurred and stops operation of the disc drive or operation of the entire disc duplicating system.

Detection errors, however, can occur for various reasons when the disc drive detects if there is a disc recording medium inside. When this happens the disc drive or the entire disc duplicating system stops operating even though such a multifeeding state has not actually occurred. While this presents no danger of damage to the duplicating system, stopping operation can reduce productivity and is thus undesirable.

SUMMARY OF THE INVENTION

The invention eliminates the effect of such detection errors when detecting if a disc recording medium is inside the disc drive.

A first aspect of the invention is a disc processing device having a disc drive device adapted to load a disc recording medium, to at least read data from or write data to the disc recording medium, and to detect whether or not a disc recording medium is in the disc drive device; a supply detection unit adapted to detect whether or not a disc recording medium has been supplied to the disc drive device; a detection control unit adapted to control the disc drive device to detect if a disc recording medium is inside the disc drive device; a result evaluation unit adapted to determine if the detection result from the supply detection unit and the detection result from the disc drive device are the same; and a control unit adapted to control, when the result evaluation unit determines that the two detection results are not the same, the detection control unit to cause the disc drive device to discharge and then load a disc recording medium, to cause the disc drive device to detect if a disc recording medium is present after this discharge and loading operation, and then to cause the result evaluation unit to determine if the new detection result from the disc drive device and the detection result from the supply detection unit are the same.

When the transportation mechanism conveys a disc recording medium to the disc drive device in this aspect of the invention, whether a disc recording medium was supplied to the disc drive device is detected based on the operation of the transportation mechanism, the disc drive device also detects if a disc recording medium is inside, and whether the results of these two detection operations are the same is determined. If the detection results are not the same, such as when a disc recording medium is detected inside the disc drive even though a disc recording medium should not be inside the disc drive, the disc drive is caused to discharge and repeat the loading operation. The disc drive is then caused to again detect if a disc recording medium is inside, and this detection result is compared with the detection result based on operation of the transportation mechanism.

By thus causing the disc drive to discharge and load when a problem supplying the disc recording medium to the disc drive is suspected, the disc drive is forced to again detect if a disc recording medium is present, and whether there is a problem supplying the disc recording medium is re-evaluated based on the latest detection results. This aspect of the invention can thus eliminate the effect of detection errors when detecting if a disc recording medium is in the disc drive, and can improve the accuracy of operating error detection, can avoid unnecessarily stopping device operation, and can improve productivity without complicating device configuration or increasing the parts count.

This aspect of the invention also causes the disc drive to repeat the operation detecting if a disc recording medium is present by causing the disc drive to execute the discharge and loading operation. The disc drive can therefore be caused to again detect if a disc recording medium is present using a common externally applied command for controlling a disc drive device known from the literature, and the invention can be easily employed without being limited by the specifications of the disc drive.

Preferably, the control unit is adapted to cause the disc drive device to execute the operation of discharging and loading a disc recording medium a plurality of times to a preset maximum number of times if the result evaluation unit determines the two detection results are not the same; and the result evaluation unit is adapted to detect a disc drive device operating error if all of the plural detection results from the disc drive device are determined to not match the detection result of the supply detection unit.

This aspect of the invention causes the disc drive device to execute the operation of detecting if a disc recording medium is present plural times up to a preset maximum number of times, and detects an operating error if none of these plural detection results match the detection result related to the operation of the transportation mechanism. The effect of detection errors can thus be reliably eliminated, and the time to detect an operating error can be shortened because the number of times the disc recording medium detection operation executes is limited. In addition, wear on the disc drive can be reduced because the number of times the disc drive executes the discharge and loading operation is limited so that it does not become excessive.

A disc processing device according to another aspect of the invention has a disc drive device adapted to load a disc recording medium, to at least read data from or write data to the disc recording medium, and to detect whether or not a disc recording medium is in the disc drive device; a supply detection unit adapted to detect whether or not a disc recording medium has been supplied to the disc drive device; a detection control unit adapted to control the disc drive device to detect if a disc recording medium is inside the disc drive device; and a result evaluation unit adapted to determine if the detection result from the supply detection unit and the detection result from the disc drive device are the same. The disc drive device is adapted to determine the type of disc recording medium when detecting the presence of a disc recording medium, and the detection control unit is adapted to detect if the disc drive device determined the type of disc recording medium when acquiring if a disc recording medium is present. If the result evaluation unit determines the two detection results are not the same but the disc drive device was able to determine the type of disc recording medium, the result evaluation unit is adapted to detect a disc drive device operating error without causing the disc drive device to discharge and load a disc recording medium.

This aspect of the invention determines an operating error has occurred if the detection result based on operation of the transportation mechanism and the detection result from the disc drive do not match but the disc drive determined the type of disc recording medium. However, if the detection result based on operation of the transportation mechanism and the detection result from the disc drive do not match but the disc drive was unable to determine the type of disc recording medium, this aspect of the invention causes the disc drive device to again detect if the disc recording medium is present.

More particularly, the invention focuses on the high probability that the disc recording medium detection operation of the disc drive device is normal if the disc drive device is able to identify the type of disc recording medium, and therefore detects an operating error without repeating the detection operation if the disc recording medium type is determined when the detection results do not match, but causes media detection to repeat in order to avoid detection errors by the disc drive if the disc drive is unable to determine the type of disc recording medium and the detection results do not match. The effect of detection errors by the disc drive are thus avoided, unnecessary detection operations by the disc drive are reduced, and operating errors can be quickly detected. Wear on the disc drive can also be reduced because the increase in the number of discharge and loading operations by the disc drive is suppressed.

The disc processing device according to another aspect of the invention is rendered as an optical disc duplicating device including a stacker that stores the disc recording media, a printing device adapted to print on the disc recording media, and a transportation mechanism adapted to convey the disc recording media to the disc drive device, and to convey the disc recording media between the stacker, the disc drive device, and the printing device.

An optical disc duplicator that records data and prints a label on a disc recording medium can thus eliminate the effects of detection errors when the disc drive detects if a disc recording medium is present. By eliminating stopping operation because of a detection error, this aspect of the invention can also improve productivity. Furthermore, because optical disc duplicators are commonly used to continuously record data and print on a plurality of disc recording media picked from a stacker that stores many disc recording media, productivity can be improved by avoiding stopping operation as a result of a detection error.

Another aspect of the invention is a control method for a disc processing device that has a disc drive device adapted to load a disc recording medium, to at least read data from or write data to the disc recording medium, and to detect whether or not a disc recording medium is in the disc drive device, the control method having steps of: detecting whether or not a disc recording medium has been supplied to the disc drive device; controlling the disc drive device to detect if a disc recording medium is inside the disc drive device; and determining if the supply-related detection result and the detection result from the disc drive device are the same, and when the two detection results are not the same, causing the disc drive device to discharge and then load a disc recording medium, causing the disc drive device to detect if a disc recording medium is present after this discharge and loading operation, determining if the new detection result from the disc drive device and the detection result related to supplying the disc recording medium are the same, and detecting a disc drive device operating error based on this evaluation result.

By thus causing the disc drive to discharge and load when a problem supplying the disc recording medium to the disc drive is suspected, the disc drive is forced to again detect if a disc recording medium is present, and whether there is a problem supplying the disc recording medium is re-evaluated based on the latest detection results. This aspect of the invention can thus eliminate the effect of detection errors when detecting if a disc recording medium is in the disc drive, and can improve the accuracy of operating error detection, can avoid unnecessarily stopping device operation, and can improve productivity without complicating device configuration or increasing the parts count.

This aspect of the invention also causes the disc drive to repeat the operation detecting if a disc recording medium is present by causing the disc drive to execute the discharge and loading operation. The disc drive can therefore be caused to again detect if a disc recording medium is present using a common externally applied command for controlling a disc drive device known from the literature, and the invention can be easily employed without being limited by the specifications of the disc drive.

The invention can eliminate the effect of detection errors when the disc drive detects if a disc recording medium is inside, improve the accuracy of problem detection without complicating the device configuration or increasing the parts count, avoid unnecessarily stopping operation, and thus improve productivity.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a flow chart describing the optical disc verification operation.

DESCRIPTION OF PREFERRED EMBODIMENTS

A preferred embodiment of the present invention is described below with reference to the accompanying figures.

Figure 1:
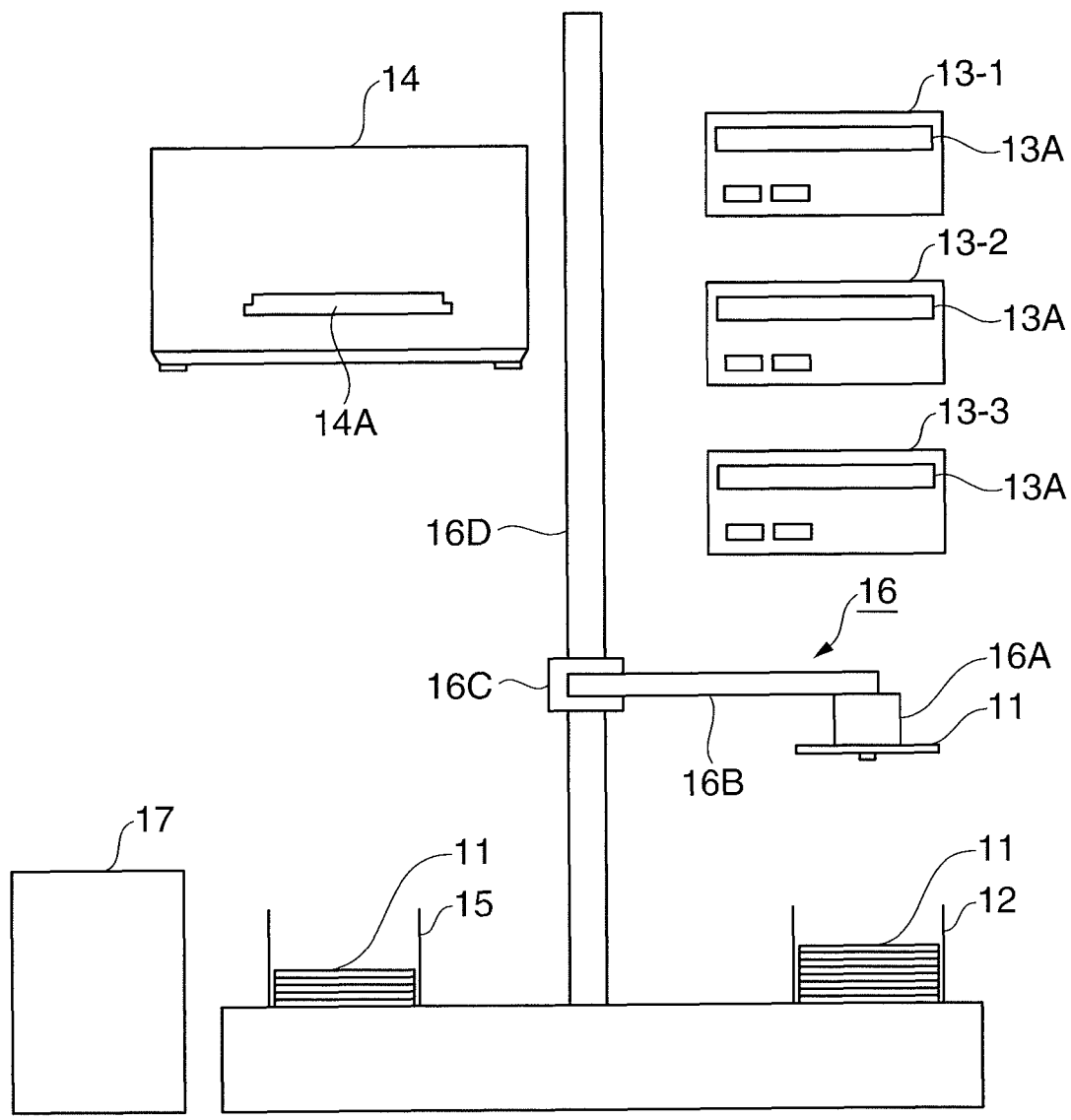
FIG. 1 schematically describes an optical disc duplicator system.

FIG. 1 schematically describes an optical disc duplicator system 10 according to a preferred embodiment of the invention.

The optical disc duplicator system 10 (disc processing device) has a first stacker 12 (stacker) for storing a plurality of blank (unrecorded) optical discs 11 (disc recording media), a plurality of optical disc drives 13-1 to 13-3 for recording prepared recording data to the blank optical discs 11, a plurality of label printers 14 (printing devices) for printing the label side of the optical discs 11 after recording is completed, a second stacker 15 for storing the optical discs after recording and label printing are completed, a transportation unit 16 (transportation mechanism) for conveying the optical discs 11 to different stations in the optical disc duplicator system 10, and a control unit 17 for controlling general operation of the optical disc duplicator system 10.

The optical disc drives 13-1 to 13-3 are tray-loading drives each having a disc tray 13A on which an optical disc 11 is placed, and can record data to the optical discs 11 and read data from the optical discs 11.

The transportation unit 16 has a handling unit 16A that picks and handles the optical discs 11, an arm rotation unit 16B that rotates the handling unit 16A, a drive unit 16C the drives the handling unit 16A and arm rotation unit 16B vertically, and a guide unit 16D that guides the drive unit 16C.

The transportation unit 16 conveys unused optical discs 11 stored in the first stacker 12 to the disc tray 13A of one of the optical disc drives 13-1 to 13-3. The transportation unit 16 also conveys optical discs 11 after data is recorded thereto by one of the optical disc drives 13-1 to 13-3 to the disc tray 14A of the label printer 14.

The label printer 14 prints an image on the label side of the optical disc 11 placed on the disc tray 14A, and when printing is completed the transportation unit 16 conveys the optical disc 11 from the disc tray 14A to the second stacker 15.

Figure 2:
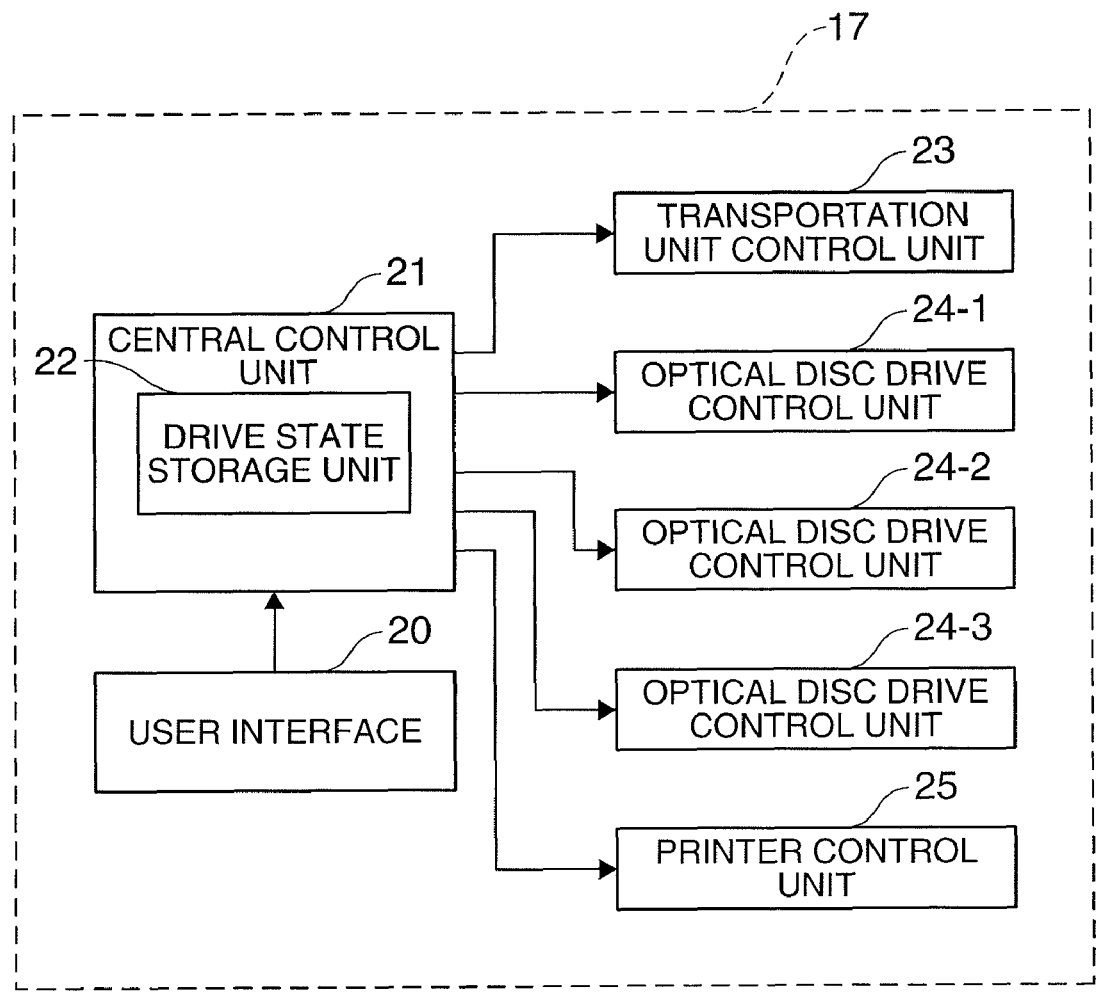
FIG. 2 is a schematic block diagram of the control unit.

FIG. 2 is a block diagram of the control unit 17.

The control unit 17 has a user interface 20 for getting input from the user of the optical disc duplicator system 10, and a central control unit 21 that controls the other parts of the optical disc duplicator system 10 according to the input from the user interface 20.

A transportation unit control unit 23 that controls operation of the transportation unit 16, optical disc drive control units 24-1 to 24-3 that respectively control the optical disc drives 13-1 to 13-3, and a printer control unit 25 that controls the label printer 14 are connected to the central control unit 21, and the central control unit 21 controls the operation of these and other parts.

The user interface 20 includes operating keys that are used by the user, indicators such as an LCD or LEDs for displaying the operating status of the optical disc duplicator system 10, and an interface for inputting data from external devices to the optical disc duplicator system 10.

The central control unit 21 has a drive state storage unit 22 that stores the status of optical discs 11 in each optical disc drive 13-1 to 13-3.

When the optical disc drives 13-1 to 13-3 execute the optical disc detection operation, the central control unit 21 sends a get status command through the optical disc drive control units 24-1 to 24-3 to the optical disc drives 13-1 to 13-3. The central control unit 21 then stores the information sent from the optical disc drives 13-1 to 13-3 as the response to the get status command in the drive state storage unit 22.

The information stored in the drive state storage unit 22, which is the information output by the optical disc drives 13-1 to 13-3, includes information denoting whether or not an optical disc 11 was detected in the optical disc detection operation, and information indicating the type of optical disc 11. In this embodiment of the invention each of the optical disc drives 13-1 to 13-3 has a function for detecting whether the type of optical disc 11 is a DVD (single-layer), DVD (dual-layer), or a CD. If the optical disc 11 is not identifiable as being one of these types, information indicating that the optical disc 11 type is unknown is output. The type of optical disc 11 may be unidentifiable if, for example, the type of optical disc 11 is not a DVD (single-layer), DVD (dual-layer), or a CD, or if a detection error occurs during the optical disc detection operation in the optical disc drive 13-1 to 13-3.

The drive state storage unit 22 stores information separately for each of the optical disc drives 13-1 to 13-3.

As controlled by the central control unit 21 in the control unit 17, the transportation unit control unit 23 causes the transportation unit 16 to operate, the optical disc drive control units 24-1 to 24-3 control the optical disc drives 13-1 to 13-3, and the printer control unit 25 controls the label printer 14 to record data and print an image on the optical discs 11 in the first stacker 12, and then accumulate the processed discs in the second stacker 15.

The control unit 17 detects operating errors in the optical disc drives 13-1 to 13-3 while the optical discs 11 are duplicated by this series of operations. This detection operation occurs after the optical disc drives 13-1 to 13-3 write data on the optical disc 11, the disc tray 13A is opened to discharge the optical disc 11 after recording is completed, and the optical disc 11 is picked up from the disc tray 13A by the transportation unit 16.

An example of this error detection operation is described next.

After the optical disc 11 is picked up from the disc tray 13A as controlled by the central control unit 21, the optical disc drive control unit 24-1 sends a close tray command to the optical disc drive 13-1 to store the disc tray 13A and load the optical disc 11. While loading the optical disc 11 the optical disc drive 13-1 detects if an optical disc 11 is present and detects whether the optical disc 11 is a DVD (single-layer), DVD (dual-layer), or a CD, and sets the disc type to unknown if the type of optical disc 11 cannot be determined. The optical disc drive 13-1 sends the optical disc 11 presence status and optical disc 11 type to the optical disc drive control unit 24-1.

The optical disc drive control unit 24-1 outputs the information sent from the optical disc drive 13-1 to the central control unit 21.

The central control unit 21 then stores this information in the drive state storage unit 22. The central control unit 21 also causes the transportation unit control unit 23 to detect the transportation unit 16 operating status, and detect whether or not an optical disc 11 was supplied to the disc tray 13A of the optical disc drive 13-1 (that is, whether an optical disc 11 is present). This can be detected based on whether the transportation unit 16 picked up an optical disc 11 from the disc tray 13A, and whether or not a new optical disc 11 was supplied to the disc tray 13A of the optical disc drive 13-1.

The central control unit 21 also determines whether the optical disc 11 status stored in the drive state storage unit 22 and the optical disc 11 status detected by the transportation unit control unit 23 are the same, and based on the results determines if an operating error occurred in the optical disc drive 13-1.

The operation of the optical disc duplicator system 10 is described in further detail below.

Figure 3:
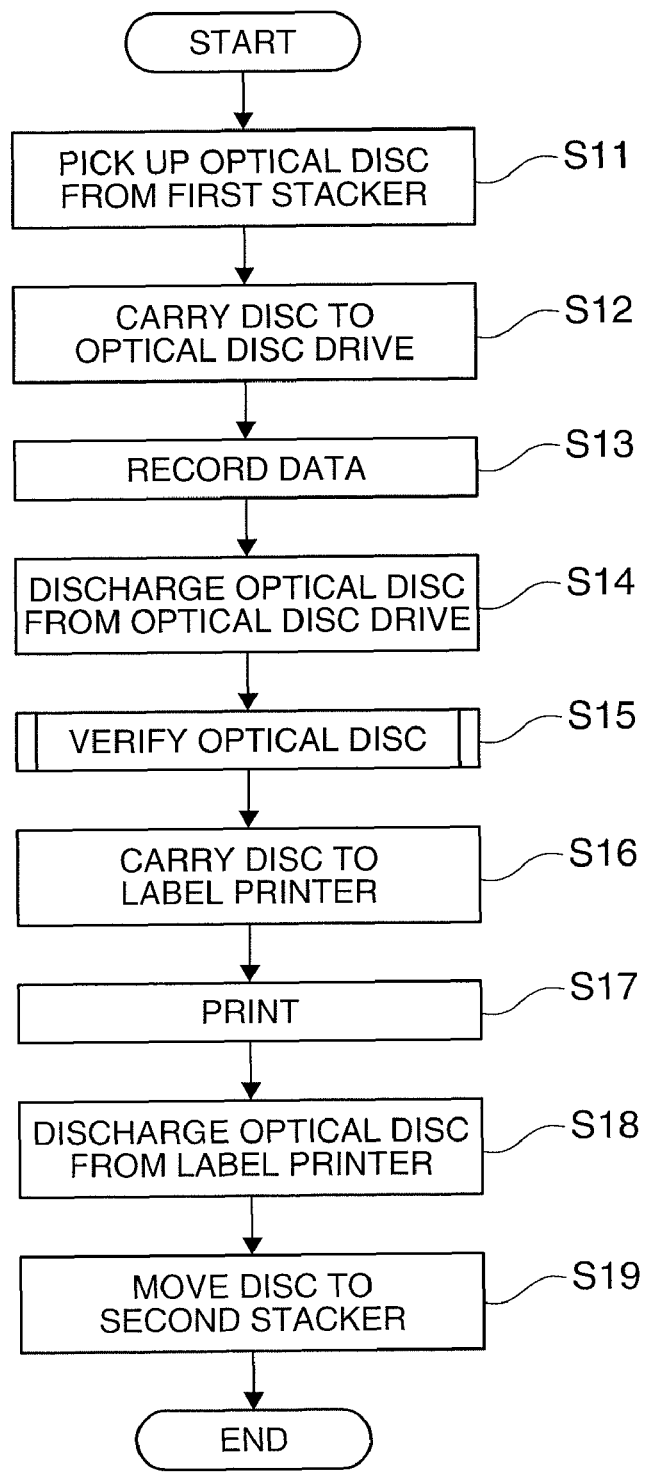
FIG. 3 is a flow chart describing the operation of the optical disc duplicator system.

FIG. 3 is a flow chart describing the operation of the optical disc duplicator system 10.

Note that for brevity below the optical disc drive 13-1 to 13-3 of the optical disc duplicator system 10 that is addressed and used for processing is identified as simply optical disc drive 13, and the corresponding optical disc drive control unit 24-1 to 24-3 is similarly referred to as simply optical disc drive control unit 24. Any of the optical disc drives 13-1 to 13-3 can be addressed in the following description, and the corresponding optical disc drive control unit 24-1 to 24-3 operates accordingly.

The transportation unit control unit 23 of the control unit 17 causes the transportation unit 16 to operate as instructed by the central control unit 21 to pick up one of the optical discs 11 stored in the first stacker 12 (step S11) and convey and place the picked optical disc 11 on the disc tray 13A (step S12). As controlled by the central control unit 21, the optical disc drive control unit 24 sends an open tray command to the optical disc drive 13, causing the optical disc drive 13 to open the disc tray 13A, and the transportation unit 16 places the optical disc 11 on the opened disc tray 13A.

As controlled by the central control unit 21, the optical disc drive control unit 24 then sends a close tray command to the optical disc drive 13, causing the optical disc drive 13 to close the disc tray 13A and load the optical disc 11. A command for writing data to the optical disc 11 and the data to be recorded on the optical disc 11 are then sent from the optical disc drive control unit 24, and the data is recorded on the optical disc 11 (step S13).

When a control command indicating that data writing is completed is sent from the optical disc drive 13 to the optical disc drive control unit 24, the optical disc drive control unit 24 sends an open tray command to the optical disc drive 13, the disc tray 13A of the optical disc drive 13 opens, and the optical disc 11 is discharged (step S14). The transportation unit control unit 23 controls the transportation unit 16 as instructed by the central control unit 21, and the optical disc 11 on the disc tray 13A is picked up by the transportation unit 16.

A close tray command is then sent to the optical disc drive 13 from the optical disc drive control unit 24, and the optical disc drive 13 closes disc tray 13A. The optical disc drive 13 loads the optical disc 11 after the disc tray 13A is closed, and the optical disc verification process described below is executed (step S15).

After the transportation unit 16 picks up the optical disc 11 to which data has been recorded from the optical disc drive 13, it conveys the recorded optical disc 11 to the disc tray 14A of the label printer 14 as controlled by the transportation unit control unit 23 (step S16).

As controlled by the central control unit 21, the printer control unit 25 sends the image data to be printed and a print command to the label printer 14, causing the label printer 14 to print on the label side of the optical disc 11 that was placed on the disc tray 14A based on the image data sent for printing from the printer control unit 25 (step S17), and the optical disc 11 is then discharged when printing is completed (step S18).

The transportation unit 16 is then controlled by the transportation unit control unit 23 so that the transportation unit 16 picks up the optical disc 11 from the disc tray 14A, carries the optical disc 11 to the second stacker 15, and deposits the optical disc 11 in the second stacker 15 (step S19), thus completing processing the optical disc 11.

Figure 5:
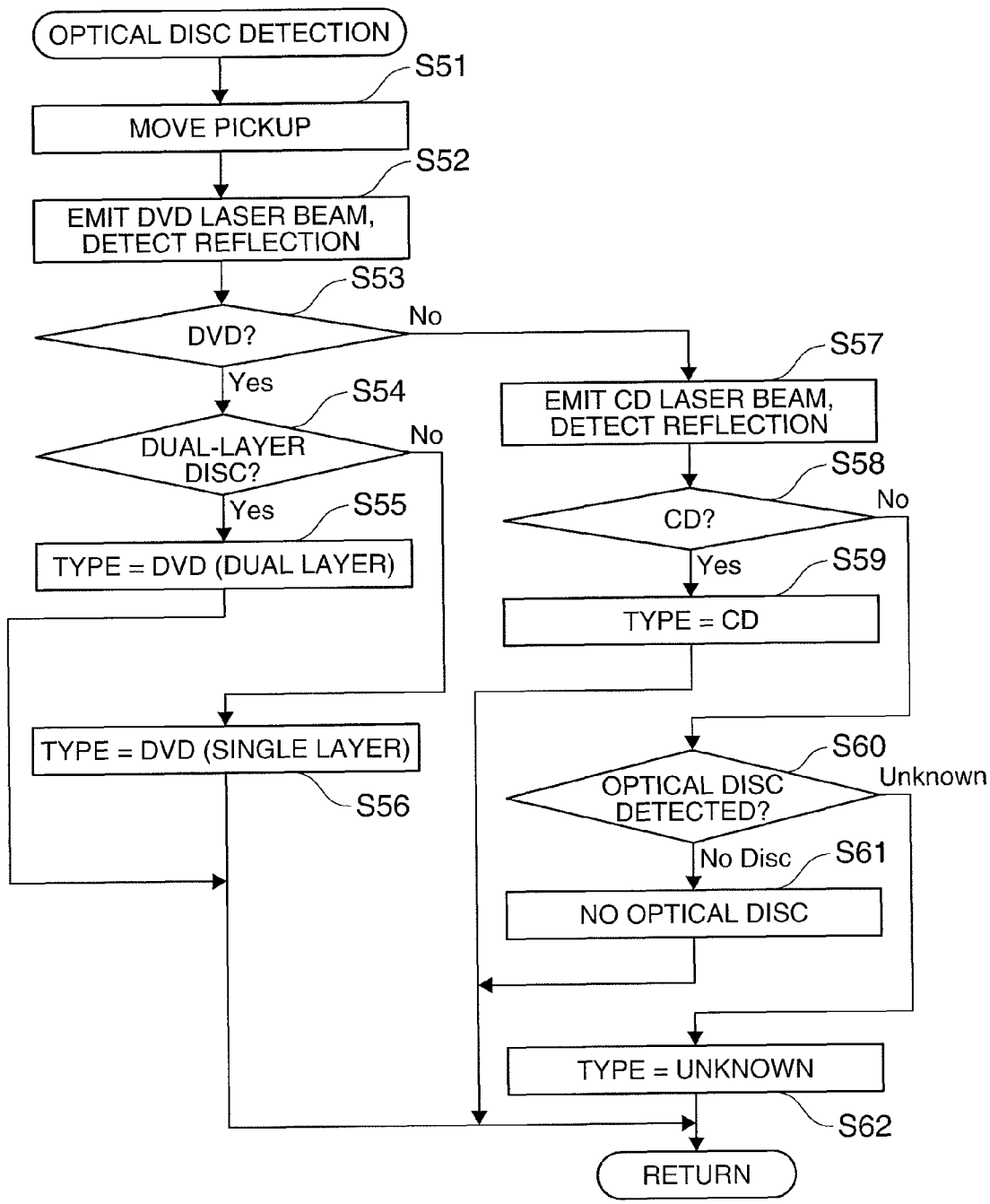
FIG. 5 is a flow chart describing the optical disc detection operation.

FIG. 4 is a flow chart describing the optical disc verification process shown in step ST15 in FIG. 3 in detail. FIG. 4A shows the operation of the control unit 17, and FIG. 4B shows the operation of the optical disc drive 13. FIG. 5 is a flow chart describing in detail the optical disc detection operation executed by the optical disc drive 13.

In the operation shown in FIG. 4 the control unit 17 functions as the supply detection unit, detection control unit, result evaluation unit, and control unit.

As shown in FIG. 4B, the optical disc drive 13 executes the operation closing the disc tray 13A (tray closing operation) according to the close tray command sent from the control unit 17 (step S41), and then executes the optical disc detection operation to detect if an optical disc 11 is on the disc tray 13A and determine the type of the optical disc 11 if present (step S42).

In this optical disc detection operation as shown in FIG. 5, the pickup unit (not shown in the figure) in the optical disc drive 13 is moved to a predetermined location (step S51), the pickup unit emits a laser beam for DVD media to the recording side of the optical disc 11, and the reflection of this beam is detected (step S52).

Whether the optical disc 11 is a type of DVD (including DVD-R, DVD+R, DVD-RW, and DVD+RW) can be determined based on the amount of light reflected from the disc (step S53). If the optical disc 11 is a DVD (step S53 returns Yes), whether the optical disc 11 is a dual layer disc is determined based on the amount of reflected light (step S54). Whether the disc is a dual layer disc can be determined based on the change in the amount of light reflected while the pickup moves, or by analyzing the light components contained in the reflection, for example.

If the optical disc 11 is determined to be a dual-layer DVD medium (step S54 returns Yes), the optical disc drive 13 recognizes the type of optical disc 11 as being a DVD (dual layer) (step S55). If the optical disc 11 is determined to be a single-layer DVD medium (step S54 returns No), the optical disc drive 13 recognizes the type of optical disc 11 as being a DVD (single layer) (step S56).

If optical disc 11 is not a DVD (step S53 returns No), the pickup unit emits a laser beam for CD media to the recording side of the optical disc 11, and the reflection of this beam is detected (step S57).

Whether the optical disc 11 is a type of CD (including CD-R and C-RW) can be determined based on the amount of light reflected from the disc (step S58). If the optical disc 11 is a CD (step S58 returns Yes), the optical disc drive 13 recognizes the type of optical disc 11 to be a CD (step S59).

If an optical disc 11 of the CD type is not detected (step S58 returns No), whether an optical disc 11 is actually present or not is determined based on the amount of reflected light (step S60). If an optical disc 11 is clearly not present (step S60 returns "No Disc"), the optical disc drive 13 knows that an optical disc 11 is not present (step S61). If it cannot be determined that an optical disc 11 is not present (step S60 returns "Unknown"), the type of optical disc 11 is determined to be unknown (step S62).

More specifically, if the state or the amount of light that is reflected from the laser beam emitted from the pickup unit differs from the state when an optical disc 11 is present and also differs from when the optical disc 11 is a CD, the type of optical disc 11 is determined to be unknown. For example, if an optical disc is inserted but it is not a recordable disc, if a disc without a recording layer that is used for print tests, or if a plain plastic disk used for protection or testing, for example, is loaded in the optical disc drive 13, the type of disc is determined to be unknown.

After determining whether or not an optical disc 11 is present and the type of optical disc 11 as shown in the optical disc detection operation in FIG. 5, control of the optical disc drive 13 returns to FIG. 4.

Referring again to FIG. 4B, the optical disc drive 13 produces detection result information indicating the result of the optical disc detection operation (step S43). This detection result information includes information indicating whether an optical disc 11 is present and the type of optical disc 11 as determined in the optical disc detection operation shown in FIG. 5.

The optical disc drive control unit 24 of the control unit 17 sends a get status command to the optical disc drive 13 (step S21 in FIG. 4A).

This get status command is received by the optical disc drive 13 (step S44), and the detection result information generated in step S43 is sent to the optical disc drive control unit 24 as the response to the get status command (step S45).

The detection result information sent from the optical disc drive 13 is read by the optical disc drive control unit 24 (step S22), and the detection result information is stored in the drive state storage unit 22 of the central control unit 21.

The central control unit 21 then compares the result of the central control unit 21 detecting if an optical disc 11 is present in the optical disc drive 13 based on the operation of the transportation unit control unit 23 with the detection result information stored in the drive state storage unit 22 (step S23), and then determines if the results match (step S24).

If the two detection results are not the same (step S24 returns No), the central control unit 21 references the detection result information in the drive state storage unit 22 and determines if the type of optical disc 11 is unknown (step S25).

If the type of optical disc 11 is unknown (step S25 returns Yes), an internal counter of the central control unit 21 is incremented (+1) (step S26). This counter counts how many times the process described below executes.

The central control unit 21 then determines whether the counter value exceeds a preset limit (step S27). If the limit is not exceeded (step S27 returns No), the central control unit 21 controls the optical disc drive control unit 24 to send an open tray command and close tray command to the optical disc drive 13 (step S28).

The open tray command and close tray command are received by the optical disc drive 13 (step S46 in FIG. 4B), and the optical disc drive 13 opens the disc tray 13A and then closes the disc tray 13A (step S47).

The optical disc drive 13 returns from step S47 to step S42 and executes the optical disc detection operation each time the disc tray 13A closes. The control unit 17 returns from step S28 to step S21, and sends a get status command to the optical disc drive 13.

The optical disc drive 13 then generates detection result information reflecting the result of the new optical disc detection operation (step S43), and if a get status command is received (step S44) returns the new detection result information in response to the get status command (step S45).

This new detection result information is received by the optical disc drive control unit 24 and stored in the drive state storage unit 22 (step S22 in FIG. 4A), and as described in step S24 above is compared with the detection result from the transportation unit control unit 23 (step S24).

If the two detection results do not match (step S24 returns No), the type of optical disc 11 contained in the new detection result information stored in the drive state storage unit 22 is determined (step S25), the counter is incremented if the optical disc 11 type is unknown (step S26), and processing repeats until the counter value exceeds the preset limit (step S27).

If the optical disc 11 presence status indicated by the detection result output from the transportation unit control unit 23 and the optical disc 11 presence status indicated by the detection result information in the drive state storage unit 22 match (step S24 returns Yes) while the process of steps S21 to S28 and step S42 to S47 repeats, the central control unit 21 determines that an error did not occur in the optical disc drive 13, that is, that operation is normal (step S30), the counter is reset (step S31), and control returns to the process shown in FIG. 3.

More particularly, if the presence or absence of an optical disc 11 as detected by the optical disc drive 13 and the presence or absence of an optical disc 11 as detected based on the operation of the transportation unit 16 are not the same, the control unit 17 causes the optical disc drive 13 to repeat the optical disc detection operation to eliminate the possibility of detection errors and avoid unnecessary operating errors caused by detection errors.

However, if the process of steps S21 to S28 and step S42 to S47 repeats until the counter exceeds the preset limit and the detection result from the transportation unit control unit 23 and the detection result information in the drive state storage unit 22 still do not match (step S27 returns Yes), the central control unit 21 determines that an error occurred in the optical disc drive 13 (step S29), the counter is reset (step S31), and control returns to the process shown in FIG. 3.

More particularly, because the control unit 17 causes the optical disc drive 13 to repeat the optical disc detection operation only until a preset maximum count is reached, the number of times the disc tray 13A is opened and closed by the optical disc drive 13 does not increase excessively, and the tray opening and closing mechanism (not shown in the figure) of the optical disc drive 13 is not subject to excessive wear.

In addition, if the detection result from the transportation unit control unit 23 and the detection result information in the drive state storage unit 22 do not match but the optical disc drive 13 is able to determine the type of optical disc 11 (step S25 returns No) while the process of steps S21 to S28 and step S42 to S47 executes once or plural times, the central control unit 21 determines that an error occurred in the optical disc drive 13 (step S29), the counter is reset (step S31), and control returns to the process shown in FIG. 3.

Because the likelihood of an optical disc 11 detection error is small if the optical disc drive 13 can successfully determine the type of optical disc 11, there is little reason to repeat the detection operation of the optical disc drive 13. As a result, by eliminating optical disc detection operations of low necessity, the optical disc duplicator system 10 can shorten the time needed to determine that an error occurred, can quickly detect errors, and can reduce wear on the tray opening and closing mechanism (not shown in the figure) of the optical disc drive 13 by interrupting the disc detection operation of the optical disc drive 13.

If an error in the optical disc drive 13 is detected in the operation shown in FIG. 4, the control unit 17 executes a process to stop the optical disc drive 13 that detected an error or stop all operation of the optical disc duplicator system 10. In this situation the control unit 17 outputs a message to the LCD of the user interface 20, for example, to inform the user that optical disc 11 multifeeding was detected and prompt the user to remove the disc from the disc tray 13A. To prevent multifeeding from occurring again, a message prompting the user to separate the optical discs 11 in the first stacker 12 to prevent the discs from sticking together may also be displayed.

When only the optical disc drive 13 that detected an error is stopped, the control unit 17 conveys optical discs 11 by means of the transportation unit 16 only to the optical disc drives 13 other than the one where an error was detected for recording data and printing labels on the optical discs 11.

As described above, in an optical disc duplicator system 10 according to this embodiment of the invention the control unit 17 detects by means of the transportation unit control unit 23 (supply detection unit) if optical discs 11 were supplied to the optical disc drives 13-1 to 13-3 by means of the transportation unit 16, controls the optical disc drives 13-1 to 13-3 to detect if there is an optical disc 11 inside, and then determines if these detection results match. If the two detection results do not match, the control unit 17 causes the optical disc drive 13-1 to 13-3 to open and close the respective disc tray 13A, or more particularly causes the optical disc drive 13-1 to 13-3 to eject and then reload the optical disc 11, so that the optical disc drive 13-1 to 13-3 repeats the optical disc detection operation after discharging and then reloading the disc, and then determines if the detection result from this new optical disc detection operation matches the detection result from the supply detection unit.

As a result, if a problem occurred supplying an optical disc 11 to the optical disc drives 13-1 to 13-3, causing the disc tray 13A to open and close again forces the optical disc drive 13-1 to 13-3 to repeat the optical disc detection operation, and the optical disc 11 supply problem is re-evaluated based on the resulting detection results.

The invention can therefore eliminate the effect of detection errors in the optical disc detection operation of the optical disc drives 13-1 to 13-3, can improve the accuracy of operating error detection without complicating the system configuration or increasing the parts count, can avoid unnecessarily stopping device operation, and can improve productivity.

Note that an optical disc 11 supply problem (error) in the optical disc drive 13 indicates a state in which optical discs 11 were multifed (double-fed) by the transportation unit 16, the multifed optical discs 11 separated inside the optical disc drives 13-1 to 13-3, and an optical disc 11 remains on the disc tray 13A even though one optical disc 11 was picked up by the transportation unit 16 from the disc tray 13A.

When such an optical disc 11 supply error occurs, the control unit 17 stops the optical disc drive 13-1 to 13-3 where the supply problem occurred, or stops all operation of the optical disc duplicator system 10, in order to avoid damage to the device or system.

As a result, the optical disc drives 13-1 to 13-3 or the entire optical disc duplicator system 10 will stop operating even though there is no problem with the disc tray 13A if an error is detected due to a detection error by the optical disc drive 13.

By eliminating the effect of detection errors in the optical disc detection operation of the optical disc drives 13-1 to 13-3, the optical disc duplicator system 10 according to this embodiment of the invention can avoid stopping operation unnecessarily and can improve productivity. An optical disc duplicator system 10 is typically used with numerous optical discs 11 stored in the first stacker 12 so that data can be recorded and labels can be printed on the numerous optical discs 11 in a continuous operation, and productivity can be improved if stopping operation due to detection errors can be avoided.

The optical disc duplicator system 10 also causes the optical disc detection operation (FIG. 5) to be executed by sending a command to open and close the disc tray 13A to the optical disc drives 13-1 to 13-3. Such commands for opening and closing the disc tray 13A are widely used in the disc drives that are generally used to read and write data to DVD, CD, and other disc recording media, and such drive devices typically execute an optical disc detection operation after the tray closes. It is therefore possible to cause the optical disc detection operation to execute again using a common command for externally controlling optical disc drives 13-1 to 13-3 known from the literature, and the method of the invention can be easily employed without being limited by the specifications of the optical disc drives 13-1 to 13-3.

As also described above the control unit 17 causes the optical disc drive 13-1 to 13-3 to execute the optical disc detection operation for a preset maximum number of times, and detects an error in the optical disc drive 13-1 to 13-3 if all of the detection results from the plural optical disc detection operations do not match the result of detecting if an optical disc 11 is present by the transportation unit control unit 23. As a result, the effect of detection errors can be reliably eliminated, and the time required for error detection can be suppressed.

In addition, by preventing the disc tray 13A from opening and closing an excessive number of times, wear on the optical disc drives 13-1 to 13-3 can also be suppressed.

The optical disc drives 13-1 to 13-3 also have a function for identifying the type of optical disc 11 in the optical disc detection operation and outputting to the control unit 17 detection result information containing the identified disc type or information indicating an unknown disc type, and the control unit 17 determines that the type of optical disc 11 in the detection result information is unknown if the presence of an optical disc 11 detected from the operation of the transportation unit 16 and the presence of an optical disc 11 as detected in the optical disc detection operation do not match. The above process repeats if the disc type is unknown, but an error is returned and the optical disc detection operation does not repeat if the disc type is identified. Because detection is not attempted again when the likelihood of a detection error in the optical disc detection operation is low, the time required for error detection can be suppressed, the number of times the disc tray 13A opens and closes can be suppressed, and unnecessary wear on the optical disc drives 13-1 to 13-3 can be prevented.

It will be obvious to one with ordinary skill in the related art that the embodiment described above is but one example of the invention, which can be improved, modified, and adapted in many ways without departing from the scope of the accompanying claims.

For example, the optical disc duplicator system 10 has three optical disc drives 13-1 to 13-3 in the embodiment described above, but the invention is not so limited and there may be any desired number of optical disc drives 13.

In addition, the types of optical discs 11 that are used in the optical disc duplicator system 10 are not limited to DVD and CD media as described above, and various types of media, including so-called next-generation DVD media can also be used.

In this case the optical disc drive 13 can be rendered capable of determining media types including DVD, CD, and next-generation DVD media, and whether the disc is a single-layer or dual-layer disc can be determined after the optical disc drive 13 identifies the type of optical disc 11, and more particularly after determining if the disc is a DVD-R, DVD+R, DVD-RW, or DVD+RW medium.

In addition, the commands exchanged between the control unit 17 and the optical disc drives 13-1 to 13-3, and the specific method of detecting if an optical disc 11 is present or not on the disc tray 13A based on operation of the transportation unit 16, are not limited.

The optical disc drives 13-1 to 13-3 are also not limited to devices having a disc tray 13A, and include slot-loading drives and multidisc drives capable of storing a plurality of optical discs 11 in a single optical disc drive 13-1 to 13-3 and writing data to each of the plural optical discs 11.

The label printer 14 is also described as being an inkjet printer that prints images by discharging ink, for example, to the label side of the optical discs 11, but any method of discharging ink, including discharging ink by vibration of a piezoelectric device or discharging ink by means of the volume change induced by heating the ink, may be used. Further alternatively, the printer may be a dye sublimation printer or a thermal transfer printer, for example.

The configuration shown in FIG. 2 describes function blocks of the control unit 17 rendered by cooperation of software and hardware, and the control unit 17 is not actually rendered as shown in FIG. 2. The steps shown in FIG. 3 to FIG. 5 are rendered in the same way, and the specific detailed configuration of the optical disc duplicator system 10 can also be suitably changed.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A disc processing device comprising:
    a disc drive device adapted to load a disc recording medium, to at least read data from or write data to the disc recording medium, and to determine a detection result for a presence of the disc recording medium in the disc drive device;
    a supply detection unit adapted to determine a supply indication for supplying the disc recording medium to the disc drive device;
    a detection control unit adapted to control the disc drive device to perform the determination of the detection result;
    a result evaluation unit adapted to determine a compatibility indication for compatibility between the supply indication from the supply detection unit and the detection result from the disc drive device; and
    a control unit adapted to, based on the compatibility indication showing incompatibly between the supply indication and the detection result, control:
        the detection control unit to control the disc drive device to perform a discharge operation and then a load operation, and to control the disc drive device to determine a new detection result for the presence of the disc recording medium after the discharge and loading operations, and
        the result evaluation unit to determine a compatibility indication between the new detection result from the disc drive device and the supply indication from the supply detection unit.

2. The disc processing device described in claim 1, wherein:
    the control unit is adapted to control the disc drive device to perform the discharge and loading operations and determine detection results each time for a plurality of times, according to a preset maximum number of times, based on the result evaluation unit determining an incompatible compatibility result between the new detection result and the supply indication; and
    the result evaluation unit is adapted to determine the positive occurrence of a disc drive device operating error based on each of the plurality of detection results being incompatible with the supply indication of the supply detection unit.

3. The disc processing device described in claim 1, wherein:
    the disc processing device is an optical disc duplicating device including:
        a stacker that stores the disc recording media,
        a printing device adapted to print on the disc recording media, and
        a transportation mechanism adapted to convey the disc recording media to the disc drive device, and to convey the disc recording media between the stacker, the disc drive device, and the printing device.

4. A disc processing device comprising:
    a disc drive device adapted to load a disc recording medium, to at least read data from or write data to the disc recording medium, and to determine a detection result for a presence of the disc recording medium in the disc drive device;
    a supply detection unit adapted to determine a supply indication for supplying the disc recording medium to the disc drive device;
    a detection control unit adapted to control the disc drive device to perform the determination of the detection result;
    a result evaluation unit adapted to determine a compatibility indication for compatibility between the supply indication from the supply detection unit and the detection result from the disc drive device;
    wherein the disc drive device is adapted to determine a type determination for indicating a type of the disc recording medium during detecting the presence of the disc recording medium;
    wherein the detection control unit is adapted to receive the type determination from the disc drive device, the type determination indicating that the type of the disc recording medium was determined by the disc drive device, during determination of the detection result for the presence of the disc recording medium; and
    wherein the result evaluation unit is adapted to determine the positive occurrence of a disc drive device operating error without requiring the disc drive device to perform any discharge and load operation based on the result evaluation unit determining an incompatible compatibility indication, and based on the detection control unit receiving the type determination indicating the actual type of the disc recording medium.

5. The disc processing device described in claim 4, wherein:
    the disc processing device is an optical disc duplicating device including:
        a stacker that stores the disc recording media,
        a printing device adapted to print on the disc recording media, and
        a transportation mechanism adapted to convey the disc recording media to the disc drive device, and to convey the disc recording media between the stacker, the disc drive device, and the printing device.

6. A control method for a disc processing device, the control method comprising steps of:
    detecting one of: a disc recording medium has and has not been supplied to a disc drive device, and providing a supply-related detection result based thereon;

controlling a disc drive device to detect one of: the disc recording medium is and is not inside the disc drive device, and providing a detection result based thereon; and determining that the supply-related detection result and the detection result from the disc drive device are one of: compatible and incompatible, wherein the supply-related detection result and the detection result are incompatible, and wherein the method further comprises:

causing the disc drive device to perform a discharge and then a load operation, causing the disc drive device to detect one of: the disc recording medium is and is not present after the discharge and loading operations, and providing a new detection result based thereon, determining that the new detection result from the disc drive device and the supply-related detection result are one of: compatible and incompatible, and providing an evaluation result based thereon, and determining one of an occurrence and a non-occurrence of a disc drive device operating error based on detecting one of: a compatible and incompatible evaluation result.

7. The control method for a disc processing device described in claim 6, wherein the evaluation result indicates that the supply-related detection result and the new detection result are incompatible, wherein the method further comprises:

causing the disc drive device to execute the discharge and load operations a plurality of times to a preset maximum number of times; and wherein detecting one of the occurrence and non-occurrence of the disc drive device operating error is further based on determining that all of the plurality detection results from the disc drive device be one of: compatible and incompatible with the supply-related detection result.

8. A control method for a disc processing device, the control method comprising:

detecting one of: a disc recording medium has and has not been supplied to the disc drive device, and providing a supply-related detection result based thereon;

controlling the disc drive device to detect one of: a disc recording medium is and is not inside the disc drive device, and providing a detection result based thereon; and to determine a type of the disc recording medium;

determining that the supply-related detection result and the detection result from the disc drive device are one of: compatible and incompatible, and detecting a disc drive device operating error without requiring the disc drive device to perform any discharge and load operations based on determining that the supply-related detection result and the detection result from the disc drive device are incompatible while the disc drive device determined the type of the disc recording medium.

* * * * *